(12) United States Patent
Kei et al.

(10) Patent No.: US 11,218,622 B2
(45) Date of Patent: Jan. 4, 2022

(54) IMAGE CAPTURING APPARATUS

(71) Applicant: CANON KABUSHIKI KAISHA, Tokyo (JP)

(72) Inventors: Hidetoshi Kei, Tokyo (JP); Keita Iwai, Kawasaki (JP); Shingo Iwatani, Chiba (JP); Ryoji Okuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/014,912

(22) Filed: Sep. 8, 2020

(65) Prior Publication Data

US 2021/0075946 A1 Mar. 11, 2021

(30) Foreign Application Priority Data

Sep. 11, 2019 (JP) .............................. JP2019-165456

(51) Int. Cl.
*H04N 5/225* (2006.01)

(52) U.S. Cl.
CPC ..... *H04N 5/225251* (2018.08); *H04N 5/2254* (2013.01)

(58) Field of Classification Search
CPC ........... H04N 5/225251; H04N 5/2254; H04N 5/22525
See application file for complete search history.

(56) References Cited

U.S. PATENT DOCUMENTS

| 2017/0187964 A1* | 6/2017 | Sato | H04N 5/232411 |
| 2019/0166290 A1* | 5/2019 | Suzuki | G06F 3/0346 |
| 2020/0252530 A1* | 8/2020 | Iwai | G03B 17/04 |
| 2021/0195078 A1* | 6/2021 | Okuno | H04N 5/22525 |

FOREIGN PATENT DOCUMENTS

JP 2017-021303 A 1/2017

* cited by examiner

*Primary Examiner* — Christopher K Peterson
(74) *Attorney, Agent, or Firm* — Canon U.S.A., Inc. I.P. Division

(57) ABSTRACT

An image capturing apparatus includes an electronic viewfinder unit that can shift between a retracted state where the electronic viewfinder unit is retracted in a main body portion of the image capturing apparatus and an extended state where the electronic viewfinder unit is extended from the main body portion. The electronic viewfinder unit includes a holding cover that holds a pivoting unit where the pivoting unit can be rotated centering on a pivot shaft, and a pivot latch member that latches in a pivoting unit pivoting operation. The pivoting unit includes an electronic display unit, an eyepiece portion, an eyepiece window to cover the eyepiece portion, and a lens holder to hold a finder lens that guides light emitted from the electronic display unit to the eyepiece portion. When the pivoting unit is being rotated, the pivot latch member regulates shifting of the electronic viewfinder unit to the retracted state.

5 Claims, 12 Drawing Sheets

FIG.7A
FIG.7B
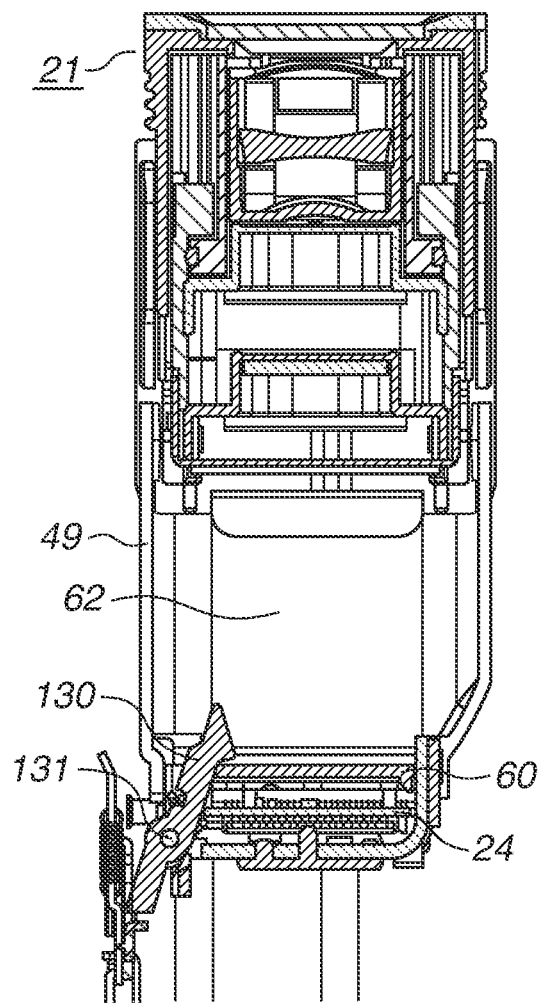
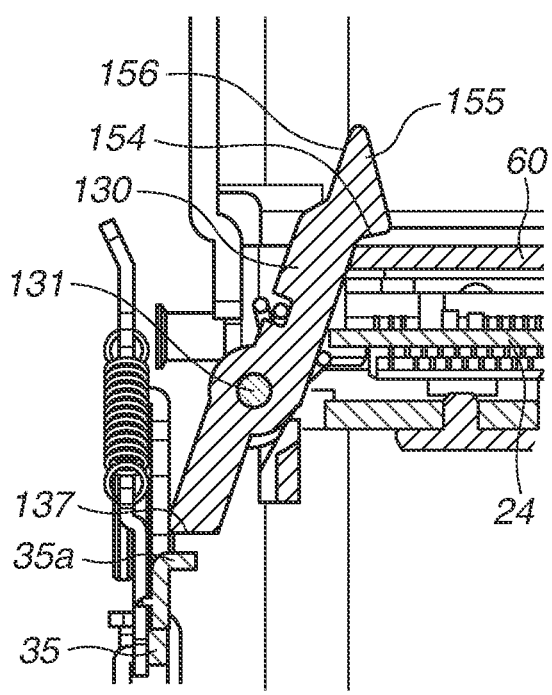

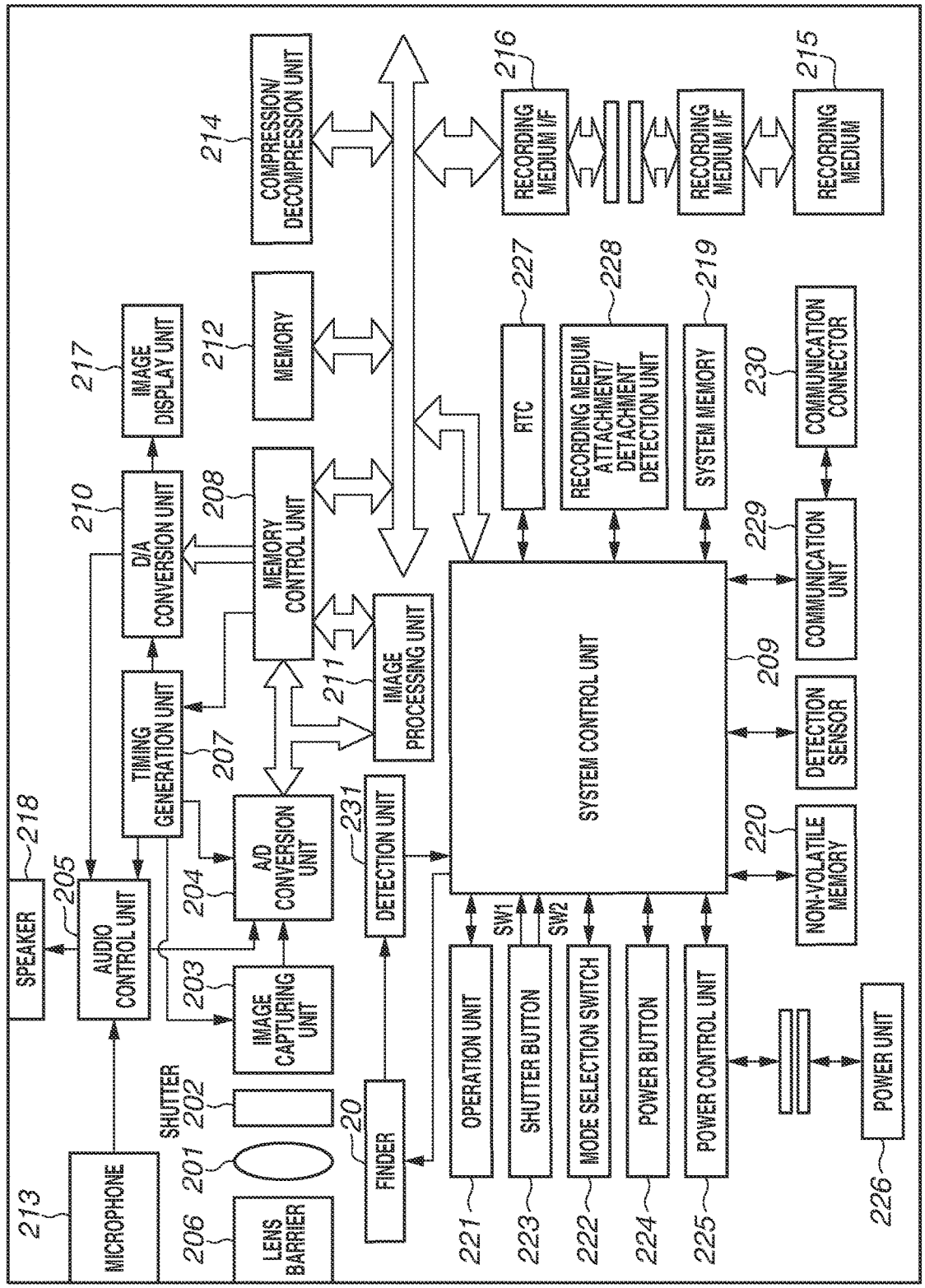

IMAGE CAPTURING APPARATUS

BACKGROUND

Field

The present disclosure relates to image capturing apparatuses that include an electronic viewfinder. In particular, the present disclosure relates to digital cameras.

Description of the Related Art

There are conventional cameras with an electronic viewfinder (hereinafter, "finder") in which an eyepiece portion of a finder can make a translational movement in an optical axis direction of the finder. In a used state, the eyepiece portion of the finder is extended in the optical axis direction of the finder to bring an optical system of the finder to a use position. When the finder is not in use, the eyepiece portion of the finder is retracted to reduce the size of a camera.

Further, there is known an apparatus in which a finder is rotatable relative to a main body of the camera so that the degree of freedom of an orientation of a photographing person increases during photographing. Japanese Patent Application Laid-Open No. 2017-021303 discusses an image capturing apparatus including a finder that is rotatable using a pivoting mechanism. In the configuration discussed in Japanese Patent Application Laid-Open No. 2017-021303, a finder portion is always extended from an outer shape of a camera. This state disturbs a photographing operation and reduces portability of the camera when the camera is not in use and being carried.

In one method of increasing the portability, the finder portion is not extended from the main body of the camera when the finder portion is not in use, while the finder portion is extended from the main body of the camera when the finder portion is in use. In other words, when the finder is in use, the finder is extended from the main body of the camera, and an eyepiece portion of the finder is also pulled out. Furthermore, the finder is rotatable when extended from the main body of the camera, so that the degree of freedom of an orientation of the photographing person increases during photographing while the size of the finder is reduced. In such a configuration, there are shifts of the state including: a) a shift between a retracted state and an extended state of the finder portion relative to the main body of the camera; b) a shift between a rotating state and a non-rotating state of the finder portion; and c) a shift of the eyepiece portion of the finder between a use position and a non-use position. For example, when the eyepiece portion of the finder is in use and in the pulled-out state, if the eyepiece portion is shifted from the extended state to the retracted state relative to the main body of the camera, the eyepiece portion of the finder may be damaged. Furthermore, an improper shift from the extended state to the retracted state may reduce convenience during use.

SUMMARY

The present disclosure is directed to an image capturing apparatus including a small finder, and when the finder is not in use, the finder is not extended from a main body of a camera, while when the finder is in use, the finder is rotatable in an extended state relative to the main body of the camera and is prevented from improperly shifting to an unintended state in the extended state.

According to an aspect of the present disclosure, an image capturing apparatus includes an electronic viewfinder unit configured to shift between a retracted state where the electronic viewfinder unit is retracted in a main body portion of the image capturing apparatus and an extended state where the electronic viewfinder unit is extended from the main body portion, wherein the electronic viewfinder unit includes a pivoting unit, a holding cover configured to hold the pivoting unit such that the pivoting unit can be rotated centering on a pivot shaft, and a pivot latch member configured to latch in a pivoting operation of the pivoting unit, wherein the pivoting unit includes an electronic display unit, an eyepiece portion, an eyepiece window configured to cover the eyepiece portion, and a lens holder configured to hold a finder lens configured to guide light emitted from the electronic display unit to the eyepiece portion, and wherein, when the pivoting unit is being rotated, the pivot latch member regulates shifting of the electronic viewfinder unit to the retracted state in the main body portion.

Further features of the present disclosure will become apparent from the following description of exemplary embodiments with reference to the attached drawings.

BRIEF DESCRIPTION OF THE DRAWINGS

FIGS. 7A and 7B illustrate a configuration for preventing a shift from an extended state to a retracted state in a pivoting operation state of the finder unit.

FIG. 8 is a block diagram illustrating an entire configuration according to an exemplary embodiment of the present disclosure.

DESCRIPTION OF THE EMBODIMENTS

Figure 1A:
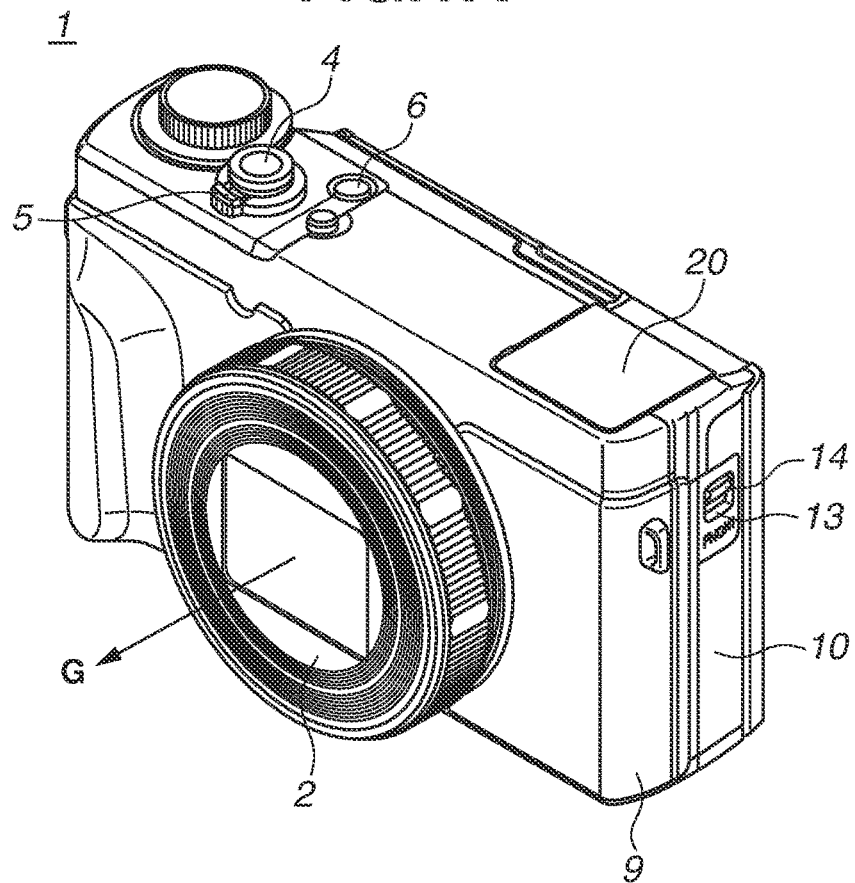
FIGS. 1A and 1B are perspective views illustrating an image capturing apparatus according to an exemplary embodiment of the present disclosure.

Various exemplary embodiments of the present disclosure will be described in detail below with reference to the drawings. In the drawings, similar members are given the same reference numeral, and overlapping descriptions are omitted.

(Description of Perspective View of Image Capturing Apparatus 1)

A configuration of an image capturing apparatus 1 as an example of an image capturing apparatus according to an exemplary embodiment of the present disclosure will be described below with reference to FIG. 1. The image capturing apparatus 1 includes an electronic viewfinder unit 21 and a lens barrel unit 2. The electronic viewfinder unit 21 can shift between a retracted state and an extended state. In the retracted state, the electronic viewfinder unit 21 is retracted in a main body portion. In the extended state, the electronic viewfinder unit 21 is extended from the main body portion. The lens barrel unit 2 includes a photographing optical system. EU is the abbreviation for "electronic viewfinder".

Figure 1B:
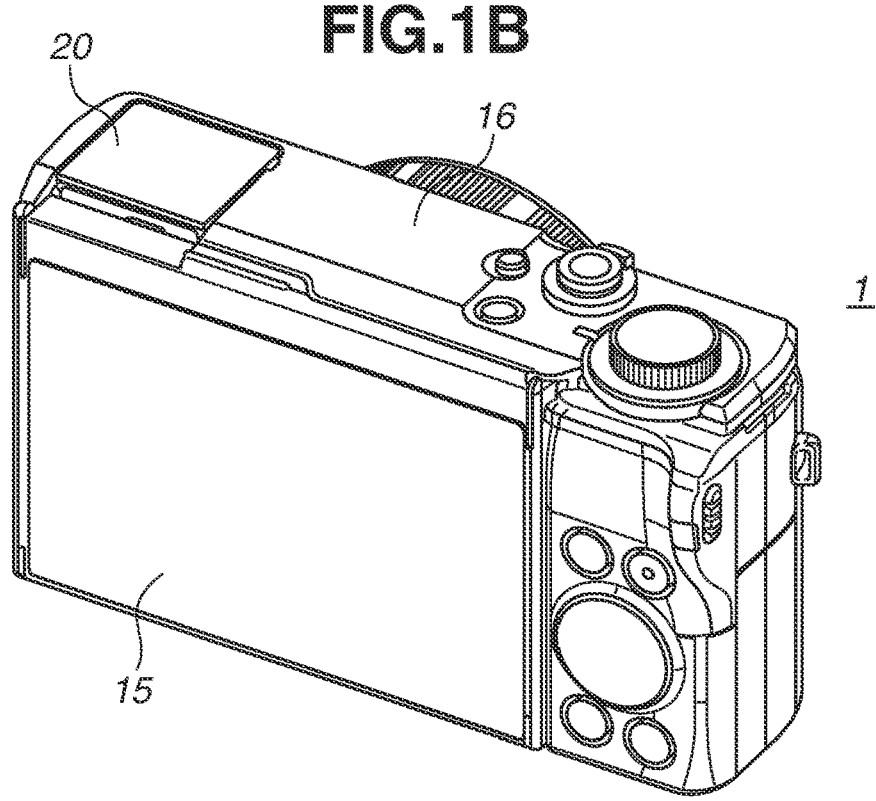

FIGS. 1A and 1B are perspective views of the image capturing apparatus 1. FIG. 1A is a front perspective view of the image capturing apparatus 1, and FIG. 1B is a rear perspective view of the image capturing apparatus 1. The image capturing apparatus 1 includes the lens barrel unit 2 including the photographing optical system (not illustrated). An arrow G indicates an optical axis direction of each photographing lens of the image capturing apparatus 1. The image capturing apparatus 1 further includes an image sensor (not illustrated) configured to photoelectrically convert an optical subject image formed via the plurality of photographing lenses of the photographing optical system and generate image data. The lens barrel unit 2 is collapsible, and when retracted, the lens barrel unit 2 collapses in the image capturing apparatus 1.

The image capturing apparatus 1 includes a main substrate (not illustrated) and an auxiliary substrate (not illustrated) on which a processing circuit configured to convert image data generated by the image sensor into digital information is mounted. If a release button 4 is fully pressed, an image is captured, and image data of a subject image is recorded on a recording medium (not illustrated). A zoom lever 5 is pivotally held around the release button 4. If the zoom lever 5 is rotated, a zoom operation is performed. A power button 6 is pressed by a photographing user to change a power state to a power-on state (use state) or a power-off state (non-use state). A display apparatus 15 is on a rear surface of the image capturing apparatus 1 and is used to check a subject image to be captured and display a reproduced captured image.

The image capturing apparatus 1 is covered by an exterior member including a front cover 9, a rear cover 10, and a top cover 16. The top cover 16 forms a top external surface of the image capturing apparatus 1 and also forms an opening portion of a finder 20. The finder 20 is built in the image capturing apparatus 1, and when retracted, the finder 20 is locked being held in the image capturing apparatus 1 by a lock mechanism. A side surface of the image capturing apparatus 1 includes a side cover 13 forming a part of an external surface. A release lever 14 is slidably held on the side cover 13 and is operated to release the lock of the finder 20 and extend the finder 20 upward from the image capturing apparatus 1.

(Description of Block Diagram in FIG. 8)

FIG. 8 is a block diagram illustrating an example of a configuration of the image capturing apparatus 1 as an example of the image capturing apparatus according to the present exemplary embodiment. The optical system includes a photographing lens 201 and a shutter 202 including a diaphragm function. An image capturing unit 203 includes a charge-coupled device (CCD) or complementary metal oxide semiconductor (CMOS) image sensor configured to convert an optical image input through the optical system into an electric signal. An analog/digital (A/D) conversion unit 204 is used to convert an analog signal output from the image capturing unit 203 into a digital signal and convert an analog signal output from an audio control unit 205 into a digital signal. A lens barrier 206 covers the image capturing unit 203 including a lens 201 of the image capturing apparatus 1 to reduce contamination and damage of the image capturing unit 203. A timing generation unit 207 is controlled by a memory control unit 208 and a system control unit 209 and supplies a clock signal and/or control signal to the image capturing unit 203, the audio control unit 205, the A/D conversion unit 204, and a digital/analog (D/A) conversion unit 210.

An image processing unit 211 performs predetermined pixel interpolation and resizing processing such as reduction, and color conversion processing on data output from the A/D conversion unit 204 and data stored on a memory 212. Further, the image processing unit 211 performs predetermined calculation on captured image data, and the system control unit 209 performs exposure control and distance measurement control based on the obtained calculation result. In this way, through-the-lens (TTL) autofocus (AF) processing, auto-exposure (AE) processing, and pre-flash emission (EF) processing are performed. The image processing unit 211 further performs predetermined calculation processing using captured image data and performs TTL auto-white balance (AWB) processing based on the obtained calculation result.

Output data from the A/D conversion unit 204 is written to the memory 212 either via the image processing unit 211 and the memory control unit 208 or directly via the memory control unit 208. The memory 212 stores audio data recorded by a microphone 213, captured still and moving images, and information such as a file header added to an image in configuring an image file. The memory 212 has a sufficient storage capacity to store a predetermined number of still image and a predetermined length of moving images and audio.

A compression/decompression unit 214 compresses/decompresses image data by adaptive discrete cosine transformation (ADCT), and the shutter 202 triggers the compression/decompression unit 214 so that the compression/decompression unit 214 reads a captured image stored on the memory 212, compresses the read image, and write the compressed data to the memory 212. Further, the compression/decompression unit 214 reads a compressed image read from a recording medium 215 to the memory 212, decompresses the read image, and write the decompressed data to the memory 212.

Image data written to the memory 212 by the compression/decompression unit 214 is changed into a file by a file processing unit of the system control unit 209, and the file is recorded on the recording medium 215 via a recording medium interface (recording medium I/F) 216. Further, the memory 212 is also used as a memory for image display, and display image data written to the memory 212 is displayed by an image display unit 217 via the D/A conversion unit 210.

Audio signal output from the microphone 213 is converted into a digital signal by the A/D conversion unit 204 via the audio control unit 205 including an amplifier, and thereafter the digital signal is stored on the memory 212 by the memory control unit 208. Further, audio data recorded on the recording medium 215 is read to the memory 212 and thereafter processed into a signal by the audio control unit 205 via the D/A conversion unit 210, and a speaker 218 produces a sound based on the signal.

The system control unit 209 controls the entire image capturing apparatus 1. A system memory 219 stores constant and variable numbers and programs for operations of the system control unit 209. A non-volatile memory 220 is an electrically erasable and recordable memory and, for example, an electrically erasable programmable read-only memory (EEPROM) is used. Shutter switches (SW1) and (SW2) and an operation unit 221 are operation units with which a user inputs various operation instructions to the system control unit 209. A mode selection switch 222 is used by a user to change an operation mode of the system control unit 209 to a still photographing mode, a continuous photographing mode, a moving image mode, or a reproduction mode.

The shutter switch (SW1) is rotated on when a shutter button 223 of the image capturing apparatus 1 is operated to a middle (half-pressed). Then, an instruction to start an operation such as AF processing, AE processing, AWB processing, or EF processing is issued. The shutter switch (SW2) is turned on when the shutter button 223 is completely operated (fully pressed), and an instruction is issued to start a series of operations of image capturing processing from reading a signal which comes from the image capturing unit 203 until writing of the image data to the recording medium 215.

An operation unit 221 includes various buttons and a touch panel. Specific examples include a delete button, a menu button, a set button, and a four-direction key arranged in a cross shape. If the menu button is pressed, a menu screen via which various settings are settable is displayed on the image display unit 217. A user can intuitively set various settings via the menu screen displayed on the image display unit 217 using four-direction key and the set button. Further, an operation on an icon displayed on the display unit 217 can be detected when a touch of a finger of a user or a touch of a pen on an operation member is detected as in a case of detecting an operation on a switch through a button or a dial. Furthermore, an operation member configured to detect a pivot, such as a jog dial, can be used to perform an operation similar to a bi-direction key.

A power button 224 turns on/off the power. A power control unit 225 includes a battery detection circuit, a direct current-direct current (DC-DC) converter, and a switch circuit configured to switch a block to which power is to be supplied. The power control unit 225 detects whether a battery is attached, detects a battery type, and detects a battery level. Further, the power control unit 225 controls the DC-DC converter based on the detection result and an instruction from the system control unit 209 and supplies a predetermined voltage to each component including the recording medium 215 for a predetermined period of time. A power unit 226 includes a primary battery, such as an alkali battery or lithium battery, a secondary battery, such as a nickel-cadmium (NiCd) battery, nickel-metal hydride (NiMH) battery, or lithium (Li) battery, and an alternating current (AC) adapter. The power unit 226 and the power control unit 225 are connected via a camera side power connector and a power connector.

A real time clock (RTC) 227 includes an internal power unit separately from the power control unit 225 and continues time measurement even in a state where the power unit 226 is off. The system control unit 209 controls a timer using time and date acquired from the RTC 227 at the time of start-up. A recording medium attachment/detachment detection unit 228 detects whether the recording medium 215 is in a recording medium slot.

A communication unit 229 performs various types of communication processing, such as Recommended Standard 232 version C (RS232C) communication, universal serial bus (USB) communication, institute of Electrical and Electronics Engineers (IEEE) 1394 communication, IEEE P1284 communication, Small Computer System Interface (SCSI) communication, modem communication, local area network (LAN) communication, and wireless communication. A communication connector 230 (which is an antenna in a case of wireless communication) connects the image capturing apparatus 1 with another device via the communication unit 229.

A detection unit 231 detects whether the finder 20 is in a state where the finder 20 is extended and can be used, and a sensor that uses mechanical and optical methods can be used. If the detection unit 231 determines that the finder 20 is in the state where the finder 20 can be used, an image on the image display unit 217 is switched to the finder 20. Then, a user can check the image displayed on the finder 20.

(Description of Operation of Finder 20)

Figure 2A:
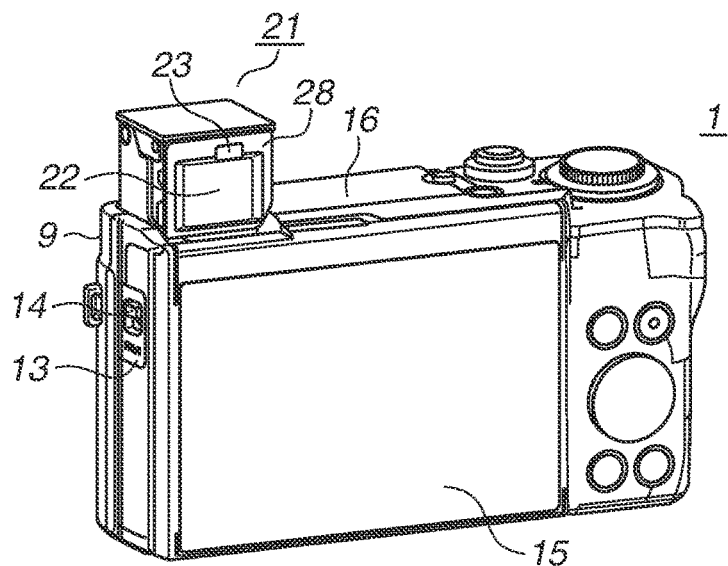
FIGS. 2A, 2B, and 2C are perspective views illustrating a finder being extended.
Figure 2B:
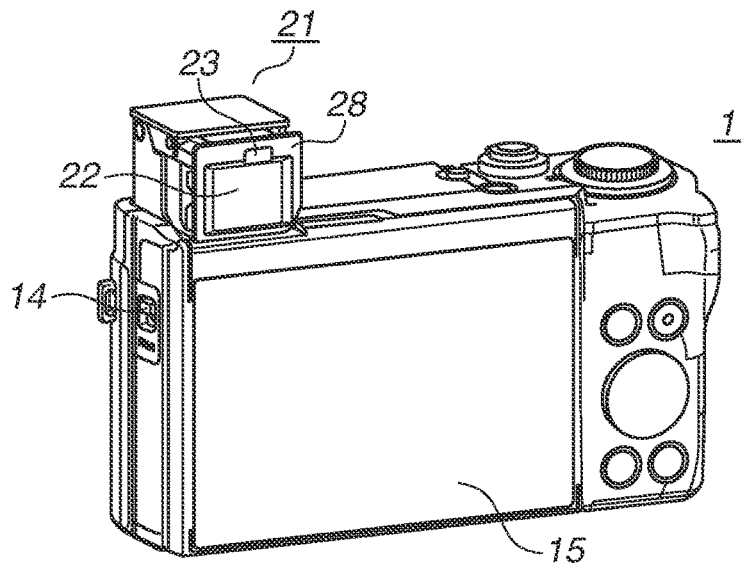
Figure 2C:
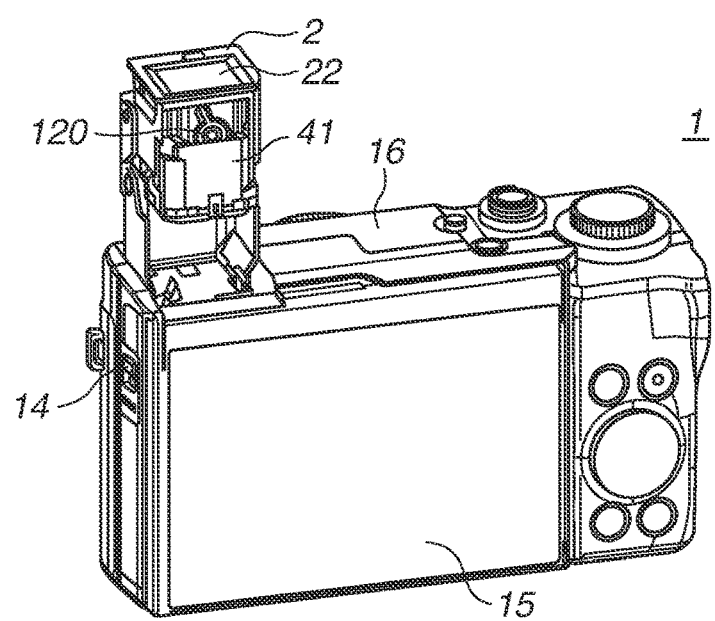

Next, an operation of the finder 20 illustrated in FIG. 1 according to the present exemplary embodiment will be described below with reference to FIGS. 2A to 2C. FIGS. 2A to 2C are rear perspective views illustrating the image capturing apparatus 1 with the finder 20 extended.

FIG. 2A illustrates a state where the release lever 14 on the side surface of the image capturing apparatus 1 is operated and the electronic viewfinder unit 21 is extended upward from a retracted state in the image capturing apparatus 1. An eyepiece window 22 is fixed to an eyepiece portion 28. A sensor window 23 is situated above the eyepiece window 22. The sensor window 23 is provided for an optical path of an internal sensor, e.g., optical detection sensor. If a user looks into the eyepiece portion 28, an internal optical sensor detects the user looking into the eyepiece portion 28 and switches display to the display on the electronic viewfinder unit 21.

FIG. 2B illustrates a state where the eyepiece portion 28 of the electronic viewfinder unit 21 in the extended state as illustrated in FIG. 2A is extended toward a position on the side of the rear surface of the image capturing apparatus 1. The finder 20 can be used in a state where the eyepiece portion 28 is extended to the front, and a subject image to be captured and a reproducing display of a captured image can be checked from the eyepiece portion 28.

FIG. 2C illustrates a state where a finder pivot portion 41 including the eyepiece portion 28 is rotated in the state where the finder 20 in FIG. 2B can be used. The finder pivot portion 41 is rotated by about 90 degrees so that the eyepiece portion 28 becomes parallel to the top cover 16. Specifically, the eyepiece window 22 is rotated to a state where the eyepiece window 22 faces a top surface of the main camera body portion. The sensor window 23 is at the top of the eyepiece window 22. In this case, the internal sensor (not illustrated) can detect a user looking into the eyepiece portion 28 within a range of the pivoting operation of the finder pivot portion 41 as a pivoting unit. Thus, a photographing user can check a subject image to be captured and a reproducing display of a captured image from the top camera surface.

A diopter adjustment lever 120 is disposed under the eyepiece portion 28 when viewed from the eyepiece window 22 in a state where the image capturing apparatus 1 is oriented as illustrated in FIG. 2B. Thus, the diopter adjustment lever 120 is exposed in a state where the eyepiece portion 28 of the electronic viewfinder unit 21 is extended and the finder pivot portion 41 is rotated by about 90 degrees. A user can adjust the diopter of the finder 20 by rotating the diopter adjustment lever 120.

(Description of Configuration of Finder 20)

Figure 3A:
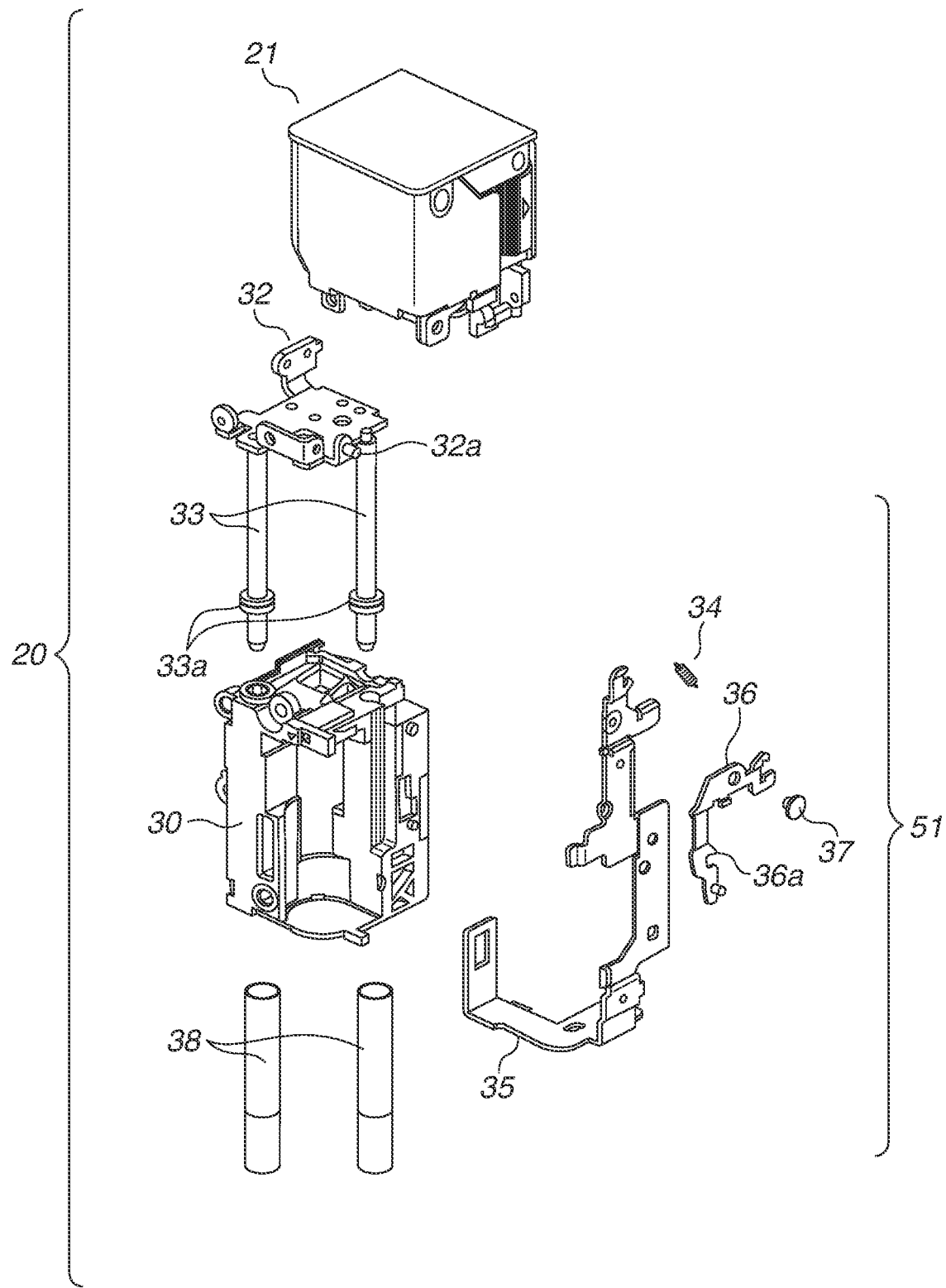
FIG. 3A is an exploded perspective view illustrating a configuration of the finder.

A configuration of the finder 20 will be described below with reference to FIGS. 3A to 3C. As illustrated in FIG. 3A, the finder 20 includes the electronic viewfinder unit 21 and a popup mechanism portion 51 configured to move upward and downward between the retracted state and the extended state.

FIG. 3A is an exploded perspective view illustrating the popup mechanism portion 51 of the finder 20. A base plate 32 as a fixing member includes a metal plate, and two guide bars 33 made of a metal material are swaged on the base plate 32. Further, the base plate 32 includes a latch pin 32*a*. A flange-formed portion 33*a* is around a portion of each guide bar 33 to increase the diameters of a portion of the guide bars 33. An EVF holder 30 is made of a resin material, and the two guide bars 33 swaged on the base plate 32 are inserted in the EVF holder 30 and held so that the two guide bars 33 are vertically slidable. At this time, the flange-formed portion 33*a* of the guide bars 33 is in contact with the EVF holder 30 so that a slide position in the extended state is determined.

The EVF holder 30 is positioned and fixed relative to the front cover 9 illustrated in FIG. 1. Each extending spring 38 is retracted in the EVF holder 30 and biases the guide bars 33 upward. A spring holder 35 is made of a plate metal material and fixed to the EVF holder 30 to hold each end portion of the extending springs 38. A lock lever 36 is held by a swaged pin 37 so that the lock lever 36 is rotatable relative to the spring holder 35. The lock lever 36 includes a latch claw portion 36*a*. A bias spring 34 includes one end latched by the lock lever 36 and another end by the spring holder 35, and biases the lock lever 36 in one direction. The lock lever 36 is rotated centering on the swaged pin 37 by operating the release lever 14 illustrated in FIG. 1. When the finder is retracted, the latch claw portion 36*a* of the lock lever 36 latches the latch pin 32*a* of the base plate 32 so that the finder 20 is maintained in the retracted state. When the finder 20 is in use, an extending operation is performed by operating the release lever 14 to rotate the lock lever 36 so that the latch pin 32*a* is unlatched.

Next, a configuration of the electronic viewfinder unit 21 will be described below.

Figure 3B:
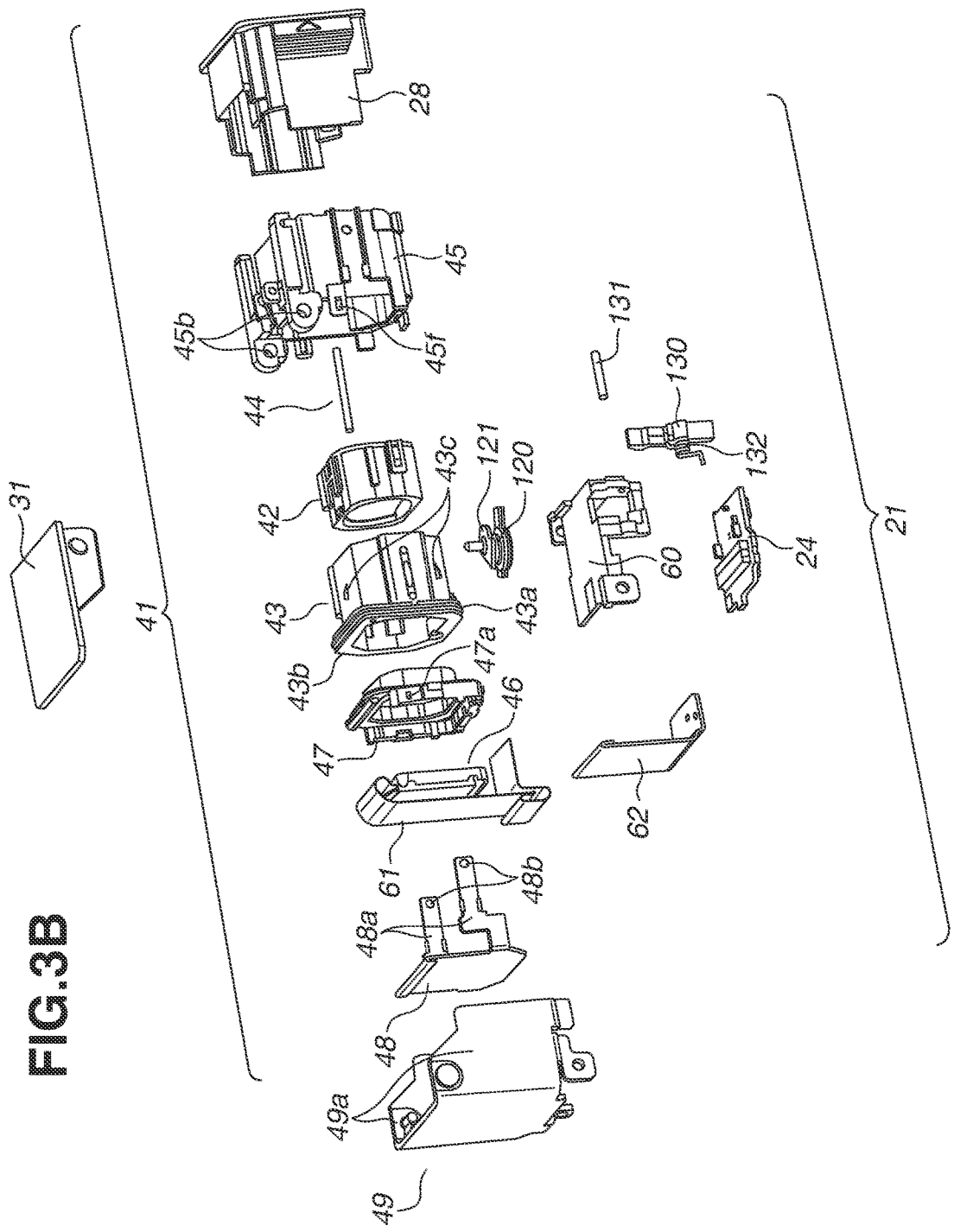
FIG. 3B is an exploded perspective view illustrating a configuration of the finder.
Figure 3C:
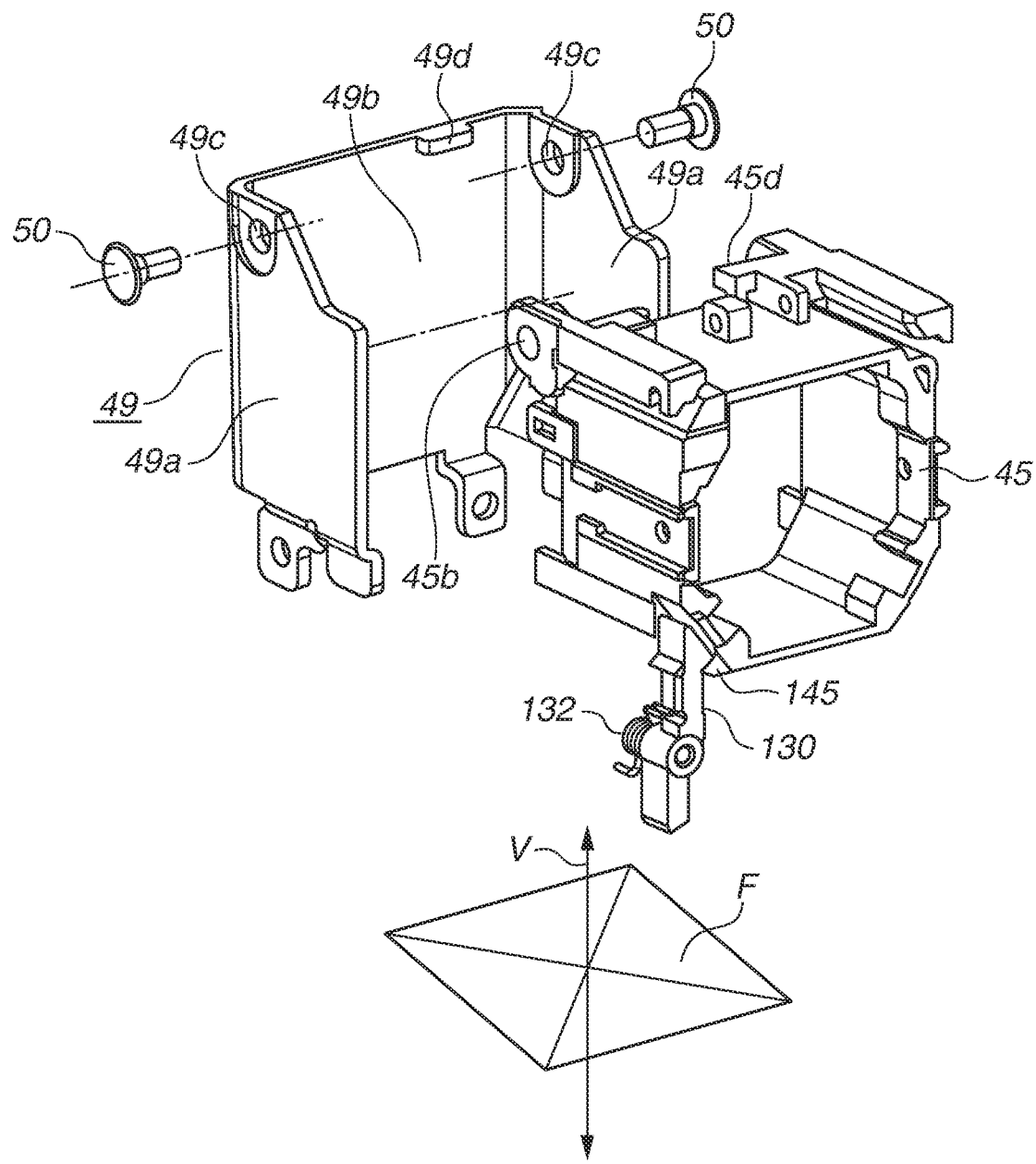
FIG. 3C is an exploded perspective view illustrating a configuration of the finder.

FIG. 3B is an exploded perspective view illustrating the electronic viewfinder unit 21. The electronic viewfinder unit 21 includes the finder pivot portion 41 as a pivoting unit and a finder cover 49 covering the finder pivot portion 41. The electronic viewfinder unit 21 is provided with a finder top cover 31. The finder top cover 31 forms an external surface of the top surface together with the top cover 16. The electronic viewfinder unit 21 further includes the finder cover 49 including a side surface 49*a*. In the extended state, the side surface 49*a* becomes two surfaces parallel a movable direction.

The side surface 49*a* of the finder cover 49 includes a first side surface and a second side surface. The first side surface is situated to the left of an optical axis of the finder lens, whereas the second side surface is situated to the right of the optical axis of the finder lens. The finder pivot portion 41 of the electronic viewfinder unit 21 includes a lens holder 42, a finder guide tube 43, and a flange portion 43*a* of the finder guide tube 43. The lens holder 42 holds the finder lens, and the finder guide tube 43 holds the lens holder 42 such that the lens holder 42 can make a translational movement in the optical axis direction of the finder lens.

The diopter adjustment lever 120 is provided with a cam shape portion 121 integrated with the diopter adjustment lever 120. If the diopter adjustment lever 120 is rotated, the cam shape portion 121 causes the lens holder 42 to make the translational movement within the finder guide tube 43. A guide shaft 44 configured to guide the finder guide tube 43 so that the finder guide tube 43 is moved directly is passed through the flange portion 43*a*. One end of the guide shaft 44 is fixed to a finder fixing tube 45.

The eyepiece portion 28 is latched to the finder guide tube 43 by latch claws 43*c* of side surfaces of the finder guide tube 43. The eyepiece portion 28 is extended to the front, so that the finder guide tube 43 supported by the guide shaft 44 makes a translational movement together with the lens holder 42 situated in the finder guide tube 43 and the eyepiece portion 28 becomes available for use. Around the flange portion 43*a* of the finder guide tube 43 is a seal member 43*b*. The seal member 43*b* seals a space between the finder fixing tube 45 and the finder guide tube 43 to form a dust-proof structure.

A display unit holder 47 holds an electronic display unit 46. A side surface of the display unit holder 47 includes a latch claw 47*a* configured to be joined by a latch portion 45*f* of the finder fixing tube 45. Arm portions 48*a* of a display panel bias plate 48 are fixed to the finder fixing tube 45 and bias a display unit 46 to the display unit holder 47. An end 48*b* of each arm portion 48*a* also serves as a click portion with respect to the finder guide tube 43 that is configured to be operated integrally when the eyepiece portion 28 is extended to the front. The display panel bias plate 48 is rotated together with the finder pivot portion 41.

A substrate base 60 is provided at a bottom of the electronic viewfinder unit 21 and in the popup mechanism portion 51 configured to move upward and downward between the retracted state and the extended state. The substrate base 60 is fixed to the base plate 32 together with the finder cover 49 by a plurality of fastening screws. A finder substrate 24 is fixed to the substrate base 60. The finder substrate 24 is connected with a flexible substrate (not illustrated) configured to transmit an image signal from the main substrate in the image capturing apparatus 1.

Further, a flexible substrate 61 connected with the electronic the display unit 46 transmits the signal. A flexible substrate cover 62 is fixed to the substrate base 60. The flexible substrate 61 is disposed in a space between a connecting surface 49*b* of the finder cover 49 and the flexible substrate cover 62.

A pivot latch member 130 is biased by a bias spring 132. A pivot latch shaft 131 is passed through the pivot latch member 130 and held by the substrate base 60. Specifically, the pivot latch member 130 is a member configured to pivot about the pivot latch shaft 131. The pivot latch shaft 131 may be integrated with the pivot latch member 130. The pivot latch member 130 latches the finder fixing tube 45. In the state where the pivot latch member 130 latches the finder fixing tube 45, the pivot latch member 130 is closer to the optical axis of the finder lens than to the surface 49*a* of the finder cover 49. Consequently, the pivot latch member 130 prevents interference with nearby members while a state of the electronic viewfinder unit 21 is shifted from the state of being retracted in the image capturing apparatus 1 to the state of being extended upward. Thus, the finder pivot portion 41 is reliably latched without shifting to an improper state while the electronic viewfinder unit 21 is shifted from the state of being retracted in the image capturing apparatus 1 to the state of being extended upward.

A cam shape portion 121 is integrated with the diopter adjustment lever 120, The cam shape portion 121 integrated with the diopter adjustment lever 120 is slidably fitted in the finder guide tube 43. If the diopter adjustment lever 120 is rotated, the lens holder 42 makes a translational movement in the finder guide tube 43 by the cam shape portion 121. Thus, a user can adjust the diopter of the finder 20 by rotating the diopter adjustment lever 120.

(Description of Finder Pivoting Operation)

Next, a finder pivoting operation will be described below with reference to FIG. 3C. FIG. 3C illustrates a relationship between the finder cover 49 and the finder fixing tube 45.

The finder cover 49 includes first and second surfaces 49a parallel to the optical axis direction of the finder lens and the movable direction of the electronic viewfinder unit 21. Finder unit pivot shafts 50 are respectively held by opening portions 49c of the first and second surfaces 49a. The finder unit pivot shaft 50 is divided into a first shaft and a second shaft. The first shaft is passed through the first surface 49a, and the second shaft is passed through the second surface 49a. While the finder unit pivot shaft 50 is divided into two members, the finder unit pivot shaft 50 can be a single member.

The first and second surfaces 49a are connected by a third surface 49b that is situated closer to the subject than the first and second surfaces 49a. The first and second surfaces 49a and the third surface 49b are substantially in U shape on a cross-section F orthogonal to a movable direction V between the retracted state and the extended state.

The finder unit pivot shaft 50 is pivotally fitted in a shaft opening portion 45b of a fixing tube 45 that constitutes the finder pivot portion 41 and held by the first and second surfaces 49a of the finder cover 49. The finder unit pivot shaft 50 is connected to the finder cover 49 having rigidity so that the finder unit pivot shaft 50 has strength as a pivot shaft. A portion of the finder unit pivot shaft 50 is pivotally fitted in the shaft opening portion 45b of the finder fixing tube 45. The finder unit pivot shaft 50 is provided on the side opposite to the eyepiece portion 28 relative to the lens holder 42 with respect to the optical axis of the finder lens and on the side where the electronic viewfinder unit 21 is extended from the optical axis of the finder lens. Thus, the finder fixing tube 45 is rotatable relative to the finder cover 49. Further, the finder cover 49 includes a pivot stopper portion 49d.

If the finder fixing tube 45 is rotated by about 90 degrees, a contact portion 45d is brought into contact with the pivot stopper portion 49d. The finder pivot portion 41 is rotatable between 0 and 90 degrees between which the optical axis of the finder lens is substantially parallel to the optical axis of the photographing optical system.

The finder pivot portion 41 includes the electronic the display unit 46, the eyepiece portion 28, the eyepiece window 22 covering the eyepiece portion 28, and the lens holder 42 holding the finder lens that guides light emitted from the electronic display unit 46 to the eyepiece portion 28.

On the outside of the finder fixing tube 45 is a latch portion 145. The pivot latch member 130 is biased to the tinder fixing tube 45 by the bias spring 132. The pivot latch member 130 is engaged with the latch portion 145 of the finder fixing tube 45 by the biasing force of the bias spring 132. The pivot latch member 130 is situated diagonally to the finder unit pivot shaft 50 when viewed from a direction vertical to the surface 49a of the finder cover 49. Thus, the finder fixing tube 45 is latched to the finder unit pivot shaft 50 at a farthest position. Consequently, the finder fixing tube 45 is reliably latched. Thus, the finder pivot portion 41 is reliably latched until the state of the finder 20 is shifted from being retracted in the image capturing apparatus 1 to being extended upward.

(Description of Details of Configuration of Finder Unit 21)

Next, details of the configuration of the electronic viewfinder unit 21 will be described below with reference to FIGS. 4A and 4B.

Figure 4A:
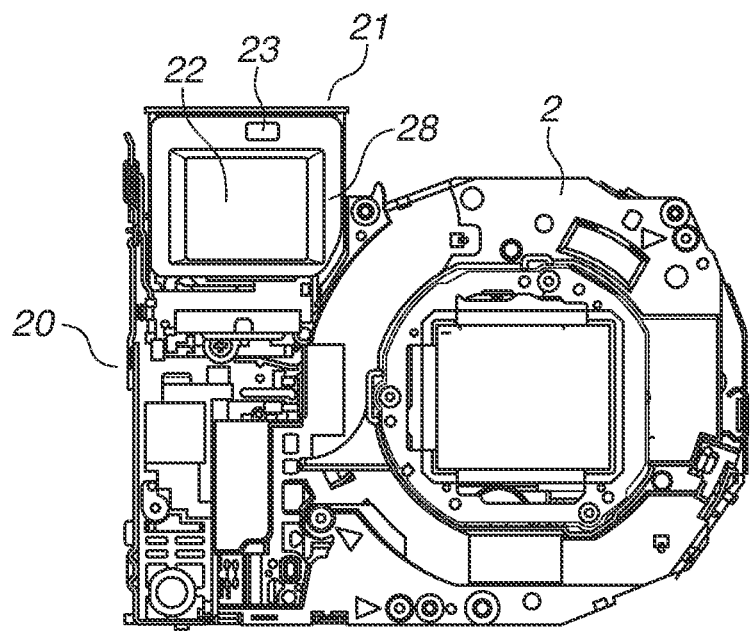
FIGS. 4A and 4B illustrate details of a configuration of a finder unit.

FIG. 4A illustrates the lens barrel unit 2 and the finder 20 in the state where the electronic viewfinder unit 21 in the image capturing apparatus 1 is retracted in the image capturing apparatus 1, as viewed from the rear surface of the image capturing apparatus 1. The finder 20 is on the left side of the lens barrel unit 2 and next to lens barrel unit 2. Further, in the state where the electronic viewfinder unit 21 is retracted in the image capturing apparatus 1, the lens barrel unit 2 is disposed on the lower right side of the eyepiece portion 28. Further, as illustrated in FIG. 2, the sensor window 23 is provided above the eyepiece window 22.

Figure 4B:
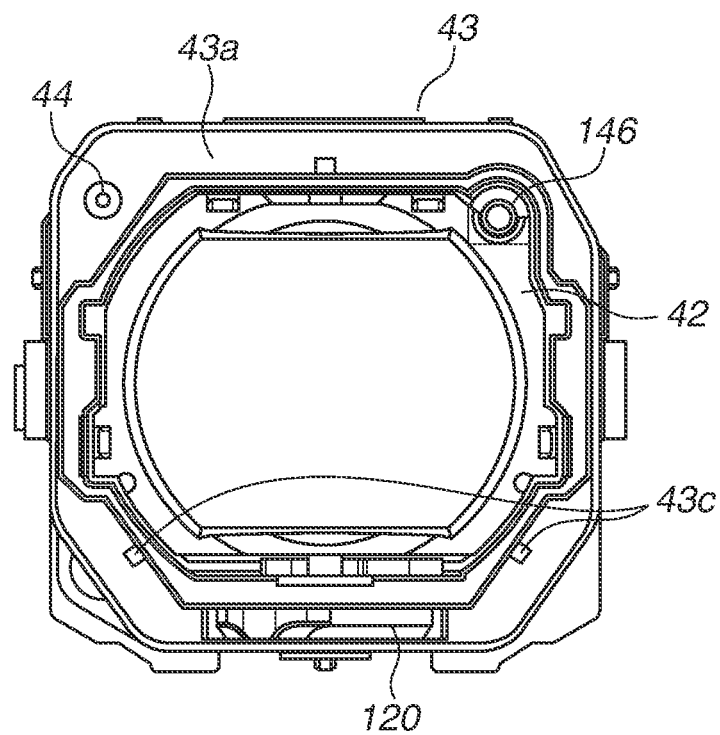

FIG. 4B illustrates the finder guide tube 43 of the finder pivot portion 41. The guide shaft 44 configured to guide the finder guide tube 43 so that the finder guide tube 43 is movable directly is passed through an upper left corner of the flange portion 43a of the finder guide tube 43. A lens holder bias spring 146 is disposed in an upper right corner of the lens holder 42, which makes a translational movement within the finder guide tube 43. In other words, the guide shaft 44 and the lens holder bias spring 146 are disposed in different upper corners of the finder guide tube 43. The latch claws 43c of the finder guide tube 43 latch the eyepiece portion 28 and the finder guide tube 43. The latch claws 43c are respectively at the lower right and the lower left of the finder guide tube 43. The diopter adjustment lever 120 is disposed on the lower surface side of the eyepiece portion 28 when viewed from the eyepiece window 22 and is slidably fitted in the finder guide tube 43. The surface of the finder guide tube 43 in which the diopter adjustment lever 120 is slidably fitted is adjacent to the surface that includes the latch claws 43c. Specifically, the positional relationship centering on the finder lens when viewed from the eyepiece window 22 is as follows. The lens holder bias spring 146 is in the upper right corner of the lens holder 42, the guide shaft 44 is in the upper left corner of the finder guide tube 43, and the latch claws 43c are at the lower right and the lower left of the finder guide tube 43.

As illustrated in FIG. 4A, the lens barrel unit 2 is disposed at the lower right of the eyepiece portion 28 in the state where the electronic viewfinder unit 21 is retracted in the image capturing apparatus 1 when viewed from the eyepiece window 22 side. Further, as illustrated in FIG. 3C, it is most suitable to situate the finder fixing tube 45 diagonally to the finder unit pivot shaft 50. Thus, the pivot latch member 130, which is a latch unit configured to regulate a pivoting operation of the finder pivot portion 41 illustrated in FIG. 3B, is disposed in the lower left of the finder pivot portion 41 when viewed from the eyepiece window 22 side. Consequently, the finder pivot portion 41 is reliably latched while prevented from shifting to an improper state without an increase in the size of the image capturing apparatus 1.

(Description of Regulation of Pivoting Operation of Electronic Viewfinder Unit 21)

Figure 5A:
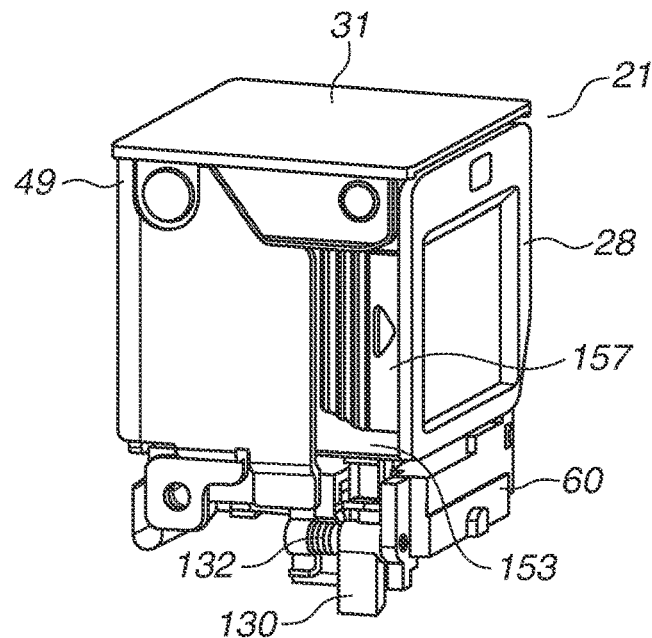
FIGS. 5A and 5B illustrate regulation of a pivoting operation of the finder unit.
Figure 5B:
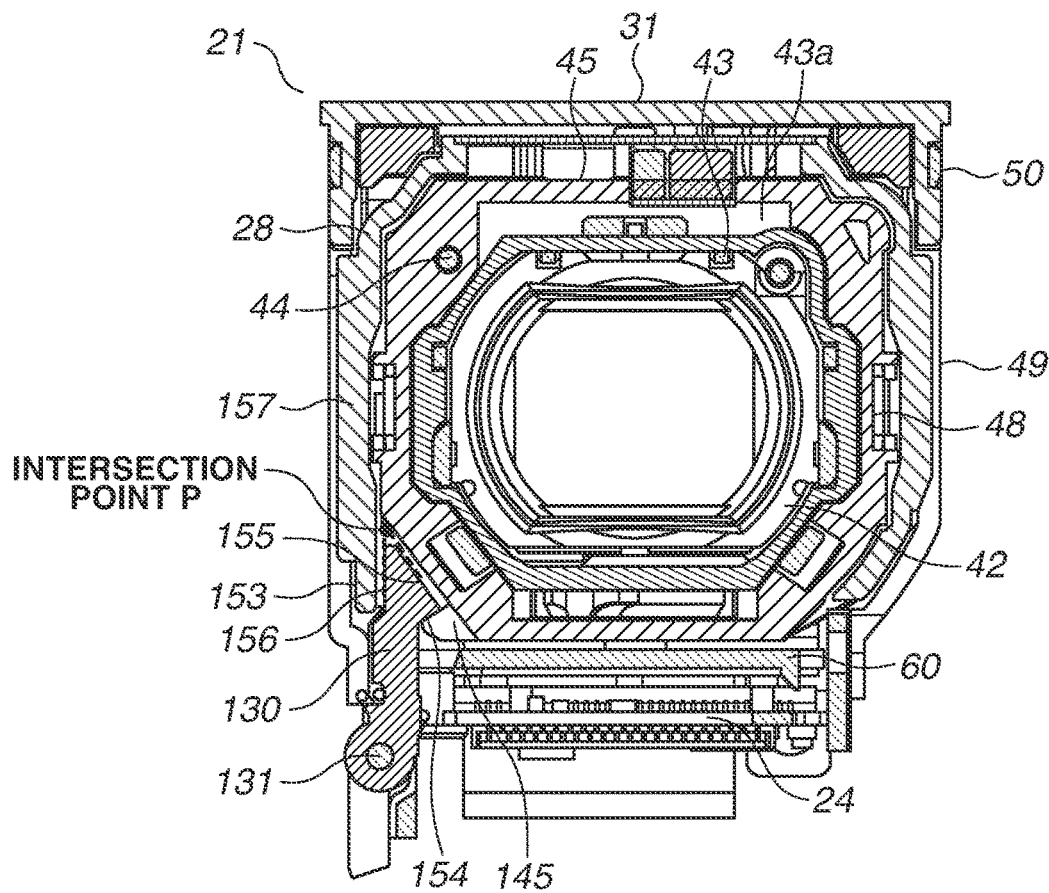

Next, the regulation of an operation of pivoting the electronic viewfinder unit 21 after the electronic viewfinder unit 21 is shifted to the extended state will be described below with reference to FIGS. 5A and 5B. FIGS. 5A and 5B illustrate the electronic viewfinder unit 21 with the eyepiece portion 28 in the retracted state.

In FIG. 5A, a grip portion 157 is configured to be gripped to extend the eyepiece portion 28. Thus, the grip portion 157 is partially thicker than the other part of the eyepiece portion 28. A regulation shape portion 153 is integrated with the eyepiece portion 28. The regulation shape portion 153 is thinner than the grip portion 157. The pivot latch member 130 is inside the regulation shape portion 153 when the eyepiece portion 28 is in the retracted state.

FIG. 5B illustrates a cross-section orthogonal to an optical axis of the finder 20 in FIG. 5A. On the cross-section orthogonal to the pivot latch shaft 131, the pivot latch member 130 includes a latch contact surface 154, an inviting surface 155, and a pivot regulation surface 156. The latch contact surface 154 is in contact with the latch portion 145 of the fixing tube 45. Thus, the finder pivot portion 41 of the electronic viewfinder unit 21 is latched in a state parallel to the optical axis of the finder lens and the image capturing lenses (not illustrated). When the eyepiece portion 28 is in the retracted state, the pivot latch member 130 is inside the regulation shape portion 153 of the eyepiece portion 28. Thus, even if the pivot latch member 130 is to be rotated against the biasing force of the bias spring 132, the pivot regulation surface 156 interferes with the regulation shape portion 153, which regulates the rotating. Specifically, when the eyepiece portion 28 is in the retracted state, the fixing tube 45 is not released from the latched state and cannot be rotated.

When viewed from the surface 49a of the finder cover 49 as a holding cover, an intersection point P of the inviting surface 155 as a tapered surface and the pivot regulation surface 156 is within a projection of the grip portion 157. The grip portion 157 is thick to ensure strength. Therefore, even if the pivot regulation surface 156 interferes with the regulation shape portion 153, the regulation shape portion 153 is unlikely to undergo elastic deformation. Thus, when the eyepiece portion 28 is in the retracted state, the fixing tube 45 is reliably latched and the finder pivot portion 41 is unlikely to pivot improperly to shift to an improper state.

(Description of Pivot Latch Member 130)

Figure 6A:
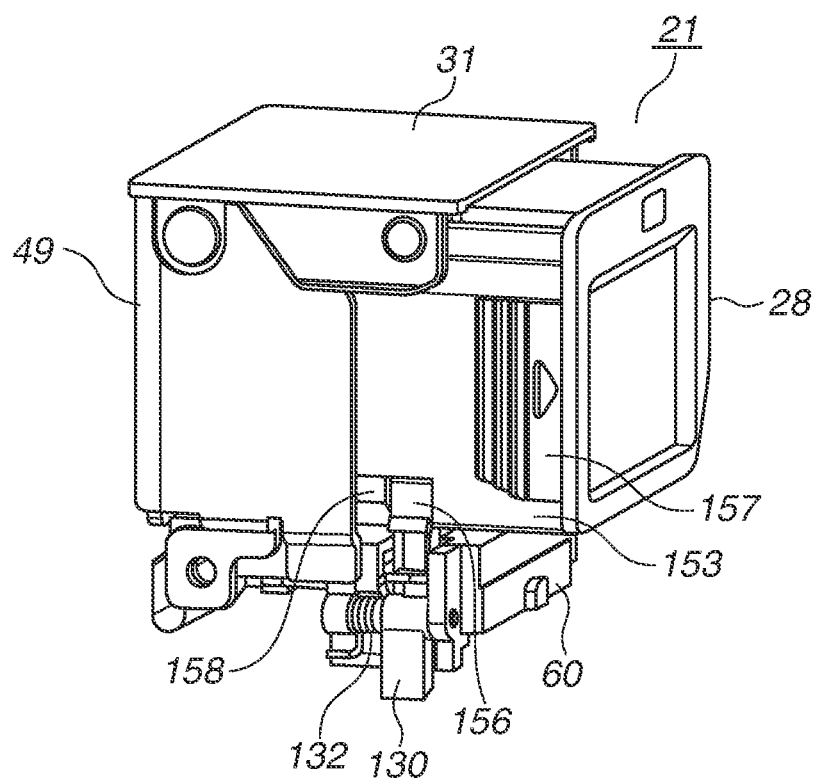
FIG. 6A illustrates regulation of a pivoting operation of the eyepiece portion and an electronic viewfinder unit 21.
Figure 6B:
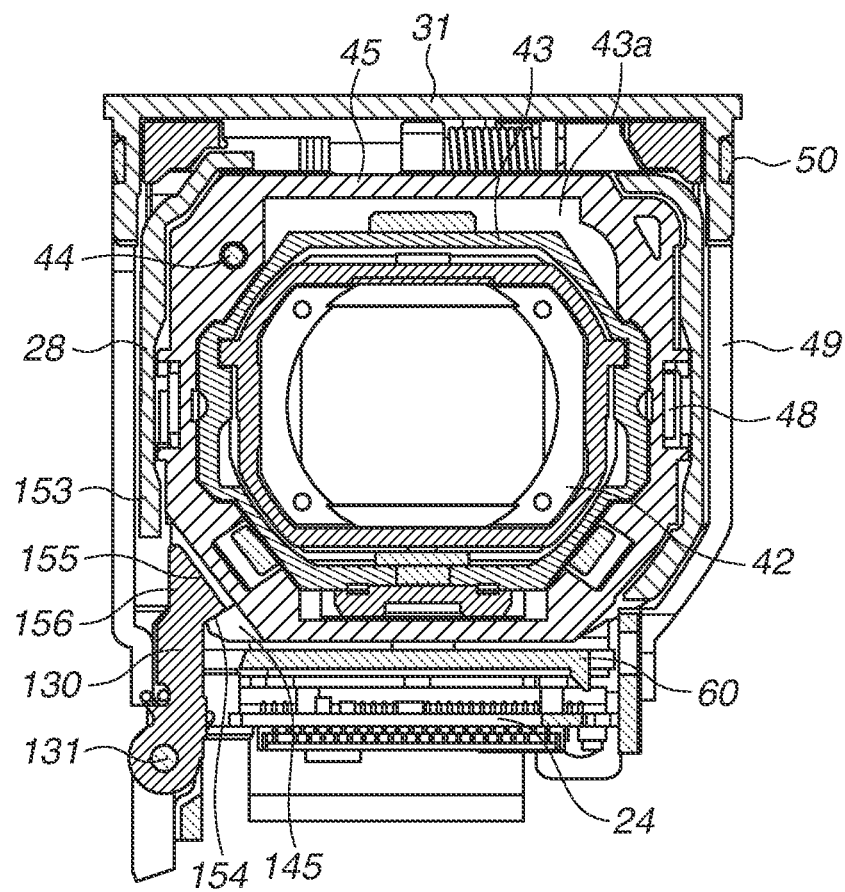
FIG. 6B illustrates regulation of a pivoting operation of the eyepiece portion and the electronic viewfinder unit 21.
Figure 6C:
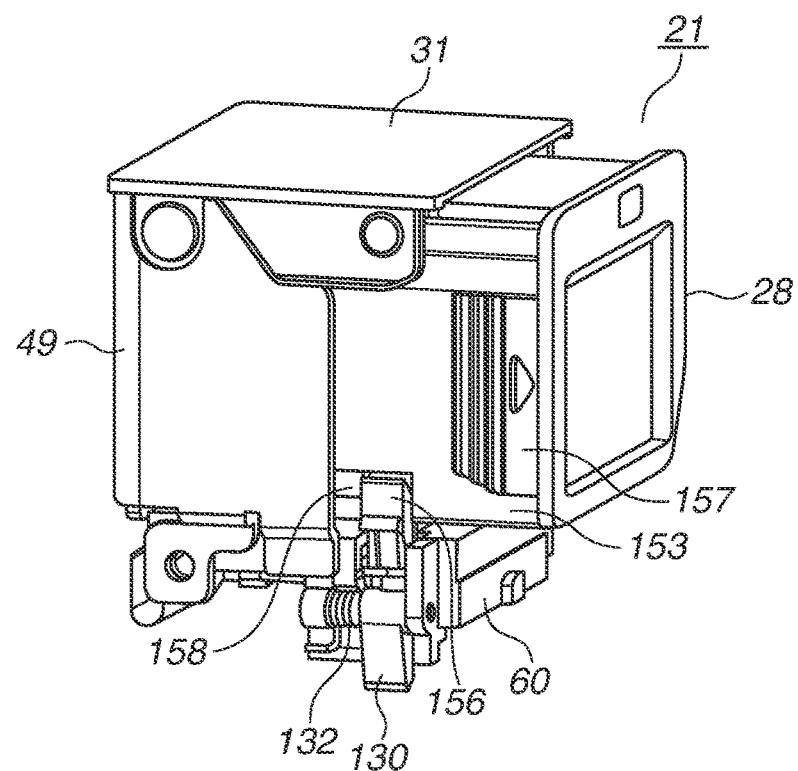
FIG. 6C illustrates regulation of a pivoting operation of the eyepiece portion and the electronic viewfinder unit 21.
Figure 6D:
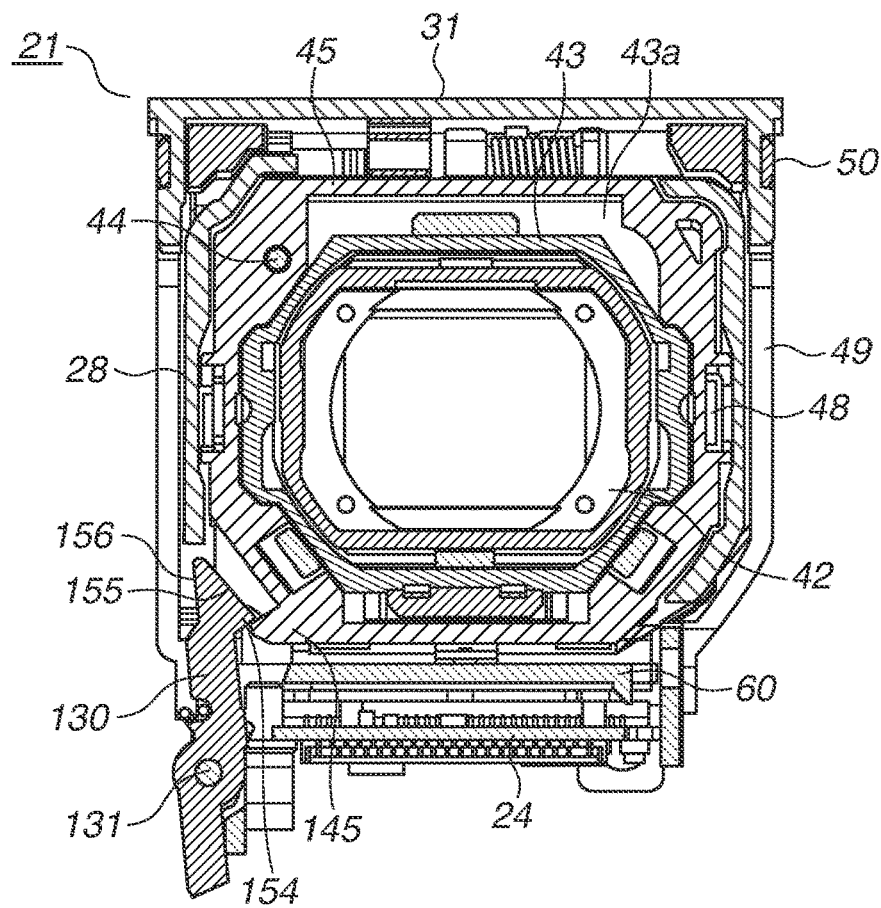
FIG. 6D illustrates regulation of a pivoting operation of the eyepiece portion and the electronic viewfinder unit 21.

FIG. 6A illustrates the electronic viewfinder unit 21 in a state where the eyepiece portion 28 is extended to a use position. FIG. 6B illustrates a cross-section orthogonal to a finder optical axis in FIG. 6A. FIG. 6C illustrates a state where pivoting of the finder pivot portion 41 is started in the state where the eyepiece portion 28 is extended to the use position in FIG. 6A. FIG. 6D illustrates a cross-section orthogonal to an optical axis direction G of the photographing lens of the image capturing apparatus 1 in FIG. 6C.

In FIG. 6A, the regulation shape portion 153 integrated with the eyepiece portion 28 includes a notch shape 158 in an extended portion of the eyepiece portion 28 in the optical axis direction of the finder 20. In the state where the eyepiece portion 28 is extended to the use position, since there is the notch shape 158, the pivot regulation surface 156 is exposed from the eyepiece portion 28. Thus, the pivot regulation surface 156 of the pivot latch member 130 is prevented from interfering with the regulation shape portion 153. Next, FIG. 6C illustrates a state where pivoting of the pivot latch member 130 is started. The latch contact surface 154 is pushed to a direction opposite to the bias direction by the latch portion 145 of the fixing tube 45 and rotated. Since there is the notch shape 158, when the pivot latch member 130 starts pivoting, the pivot regulation surface 156 is prevented from interfering with the regulation shape portion 153. Thus, the pivot latch member 130 is rotatable against the biasing force of the bias spring 132.

FIG. 6D illustrates a cross-section of FIG. 6C that is orthogonal to the optical axis direction G of the photographing lens of the image capturing apparatus 1. As illustrated in FIG. 6D, as the fixing tube 45 is rotated, the pivot latch member 130 is rotated centering on the pivot latch shaft 131. The intersection point P of the inviting surface 155 as a tapered surface and the pivot regulation surface 156 moves to a position outside an outermost portion of the eyepiece portion 28. Consequently, the latch contact surface 154 of the pivot latch member 130 is separated from the latch portion 145 of the fixing tube 45 and the latch is released. In other words, the fixing tube 45 is rotatable up to a predetermined angle.

Figure 6E:
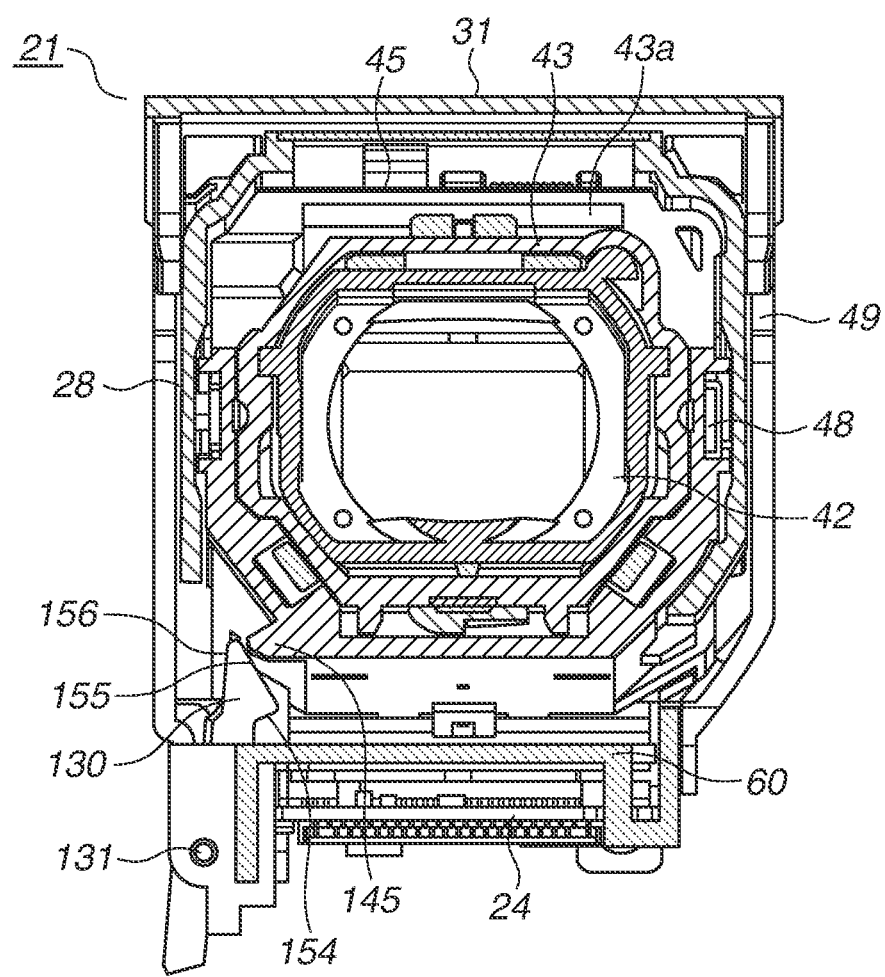
FIG. 6E illustrates regulation of a pivoting operation of the eyepiece portion and the electronic viewfinder unit 21.

FIG. 6E illustrates a cross-section orthogonal to a finder optical axis of the electronic viewfinder unit 21 when the fixing tube 45 is being shifted from a predetermined angle of rotation to the retracted state of 0 degree. The pivot latch member 130 is biased by the biasing force of the bias spring 132. When the fixing tube 45 is shifted from the predetermined angle of the rotation to the retracted state of 0 degree, the inviting surface 155 is brought into contact with the latch portion 145 as illustrated in FIG. 6E. The inviting surface 155 is brought into contact with the latch portion 145 so that the pivot latch member 130 is rotated centering on the pivot latch shaft 131 in a direction against the bias direction. In other words, the latch portion 145 rotates the pivot latch member 130. The inviting surface 155 as a tapered surface is restored to the state illustrated in FIG. 6C while being in contact with the latch portion 145. Thus, the electronic viewfinder unit 21 is shifted from the predetermined angle of rotation to the retracted state of 0 degree and is latched again.

The latch contact surface 154, the inviting surface 155, and the pivot regulation surface 156 are adjacent to each other. Thus, the size of the pivot latch member 130 is reduced. As a result, the pivot latch member 130 latches the fixing tube 45 inside the finder cover 49. Thus, in the state where the electronic viewfinder unit 21 is extended, the eyepiece portion 28 is extended and shifted to a use state, so that the electronic viewfinder unit 21 becomes rotatable. Further, when the eyepiece portion 28 is in the retracted state, the pivot latch member 130 is regulated by the regulation shape portion 153 so that the eyepiece portion 28 cannot be easily rotated, and an improper state shift of the finder pivot portion 41 is prevented.

The electronic viewfinder unit 21 in the extended state will be described below, where the electronic viewfinder unit 21 is extended from the main body portion, viewed from the eyepiece window 22 side. The pivot latch member 130 configured to latch a pivoting operation of the finder pivot portion 41 is disposed centering on the optical axis of the finder lens, on a side of the optical axis of the finder lens opposite to the finder unit pivot shafts 50 of the finder pivot portion 41 and centering on the optical axis of the finder lens on a side opposite to the lens barrel unit 2. The electronic viewfinder unit 21 can make a translational movement between the retracted state, in which the electronic viewfinder unit 21 is retracted in the main body portion, and the extended state, in which the electronic viewfinder unit 21 is extended from the main body portion. The finder pivot portion 41 includes the finder guide tube 43 configured to hold the lens holder 42 and the diopter adjustment lever 120 configured to translate the lens holder 42 relative to the optical axis of the finder lens within the finder guide tube 43. The finder pivot portion 41 further includes a detection sensor for switching a display to the display apparatus 15 of the image capturing apparatus 1 and the sensor window 23 situated on an optical path of the detection sensor.

When viewed from the eyepiece window 22 side, the sensor window 23 is disposed centering on the eyepiece window 22 on the side of the finder unit pivot shaft 50 of the finder pivot portion 41 in the translational direction of the electronic viewfinder unit 21. The diopter adjustment lever 120 is disposed centering on the eyepiece window 22 on the side opposite to the finder unit pivot shaft 50 of the finder pivot portion 41 in the translational direction of the electronic viewfinder unit 21. The finder pivot portion 41 includes the fixing tube 45 which accommodates the finder guide tube 43 such that the finder guide tube 43 is movable directly relative to the optical axis of the finder lens. The eyepiece portion 28 is latched to the finder guide tube 43 and makes a translational movement in the optical axis direction of the finder lens together with the finder guide tube 43.

A view from the eyepiece window 22 side will be described below.

The finder guide tube 43 includes the guide shaft 44, and the lens holder bias spring 146, which biases the lens holder 42. The guide shaft 44 guides the lens holder 42, centering on the eyepiece window 22, on the side of the finder unit pivot shafts 50 of the finder pivot portion 41 in the translational direction of the electronic viewfinder unit 21. When viewed from the eyepiece window 22 side, the finder guide tube 43 includes the plurality of latch claws 43c for the eyepiece portion 28 on the side opposite to the tinder unit pivot shafts 50 of the electronic viewfinder unit 21 centering on the eyepiece window 22, in the translational direction of the electronic viewfinder unit 21.

The finder cover 49 includes the two surfaces 49a of flat plates extending in a direction that is parallel to the optical axis direction G of the photographing optical system and is parallel to the movable direction between the retracted state and the extended state relative to the main body portion of the image capturing apparatus 1. In the extended state, the finder pivot portion 41 is pivotally supported by the finder unit pivot shafts 50 of the finder pivot portion 41 within the finder cover 49. When viewed from a vertical direction to the surfaces 49a of the finder cover 49, the pivot latch member 130 is disposed diagonally centering on the fixing tube 45 relative to the finder unit pivot shafts 50 of the finder pivot portion 41.

The fixing tube 45 includes the latch portion 145 for the pivot latch member 130. The substrate base 60 is fixed to the base plate 32 together with the finder cover 49. The pivot latch member 130 is pivotally supported by the substrate base 60 and is rotatable centering on the pivot latch shaft 131 extending in the optical axis direction of the finder lens. The pivot latch member 130 is biased by the bias spring 132 in a direction that brings the pivot latch member 130 into contact with the latch portion 145. When viewed from the eyepiece window 22 side, the pivot latch member 130 is closer to the optical axis of the finder lens than to the surfaces 49a of the finder cover 49 in the state where the latch portion 145 of the fixing tube 45 is latched. When the finder pivot portion 41 is being rotated, the pivot latch member 130 regulates the retracting movement of the electronic viewfinder unit 21 into the main body portion of the image capturing apparatus 1.

The pivot latch member 130 is pivotally supported by the pivot latch shaft 131 extending in the optical axis direction of the finder lens on the base plate 32 to which the finder cover 49 is fixed. The pivot latch member 130 is biased by the bias spring 132. The pivot latch member 130 is moved to a regulation position the movement of the electronic viewfinder unit 21 to the retracted state is regulated in a pivoting direction of the finder pivot portion 41. Thereafter, the pivot latch member 130 is rotatable to a latch position, at which a pivoting operation of the finder pivot portion 41 is latched, and a release position, at which a pivoting operation of the finder pivot portion 41 is unlatched, in this order.

One end of the pivot latch member 130 includes an abutment portion 137 that engages with the main body portion of the image capturing apparatus 1 at the regulation position. The latch contact surface 154 is provided at another end of the pivot latch member 130 to latch the finder pivot portion 41 and regulate a pivoting operation. When viewed from the eyepiece window 22 side, the latch contact surface 154 and the abutment portion 137 are respectively on the opposite sides of the pivot latch shaft 131. A pivoting regulation portion including the latch contact surface 154 of the other end of the pivot latch member 130 includes the inviting surface 155 as a tapered surface to return the finder pivot portion 41 from the rotated state to the latched position.

(Description of Slide Prevention Mechanism)

Next, a mechanism of preventing sliding to the position of the retracted state during a pivoting operation of the electronic viewfinder unit 21 will be described below with reference to FIGS. 7A and 7B. FIG. 7A is a cross-sectional view illustrating a configuration of the pivot latch member 130 in the state where the finder pivot portion 41 is rotated. FIG. 7B is an enlarged view illustrating details of the pivot latch member 130.

In FIG. 7A, the finder pivot portion 41 is rotated by 90 degrees as in FIG. 2C, and the pivot latch member 130 is rotated centering on the pivot latch shaft 131 by the bias spring 132 and is stopped in the state of being in contact with the substrate base 60. A top portion of the pivot latch member 130 in FIG. 7B includes the latch contact surface 154, and the latch contact surface 154 is latched to engage with the fixing tube 45 and regulates a pivoting operation. On the opposite side of the pivot latch shaft 131, the abutment portion 137 is formed. In FIGS. 7A and 7B, the pivot latch member 130 is biased from the latch position (the state in FIG. 5B) at which a pivoting operation of the electronic viewfinder unit 21 is regulated. Thus, the pivot latch member 130 is further rotated to an overstroke position. At this time, the abutment portion 137 at a part of the pivot latch member 130 is also rotated further from the latch position (the state in FIG. 5B) to a position outside the latch position and stopped.

As described above with reference to FIG. 3A, the spring holder 35 is fixed relative to the EVF holder 30 (illustrated in FIG. 3A). An abutment portion 35a of the spring holder 35 is provided to face the abutment portion 137 when the pivot latch member 130 is stopped at the overstroke position. Thus, the electronic viewfinder unit 21 in the state of being rotated, will move to the retracted state in the main body portion of the image capturing apparatus 1. In this case, the abutment portion 137 is brought into contact with the abutment portion 35a of the spring holder 35 so that a sliding movement to the retracted state is prevented. Thus, the pivot latch member 130 is biased from the latch position and rotated to the overstroke position.

The abutment portion 137 is brought into contact with the abutment portion 35a of the spring holder 35, so that a sliding movement to the retracted state is prevented. The pivot latch member 130 latches a pivoting operation of the fixing tube 45 with a single member to thereby prevent both the pivoting of the electronic viewfinder unit 21 and a movement of the electronic viewfinder unit 21 in the retracted state direction. Specifically, the electronic viewfinder unit 21 is prevented from improperly shifting to an unintended state (for example, not predetermined), using a smaller number of parts. Thus, when the camera is in use, the electronic viewfinder unit 21 is prevented from improperly lowering in the retracted state direction after the pivoting operation of the electronic viewfinder unit 21, and an error that a finder display image cannot be observed is prevented.

As described above, the latch contact surface 154 of the pivot latch member 130 is in contact with the latch portion 145 of the fixing tube 45. When the eyepiece portion 28 is in the retracted state, the pivoting of the pivot regulation surface 156 of the pivot latch member 130 is regulated by the regulation shape portion 153 of the eyepiece portion 28. Thus, the finder pivot portion 41 of the electronic viewfinder unit 21 is latched in a state where it is parallel to the finder lens optical axis and the image capturing lenses (not illustrated). Further, the abutment portion 137 of the pivot latch member 130 is brought into contact with the abutment portion 35a of the spring holder 35 to thereby prevent a sliding movement to the retracted state. An improper shift of the finder 20 to an unintended state depending on the state of the eyepiece portion 28 is prevented, so that a decrease in convenience is prevented and the camera is prevented from being damaged.

In another exemplary embodiment, another member may have a function of preventing the pivoting of the electronic viewfinder unit 21 and a function of preventing a movement in the retracted state direction. The pivoting regulation portion of the pivot latch member 130 includes the pivot regulation surface 156, and the eyepiece portion 28 includes the regulation shape portion 153. When the finder pivot portion 41 is in the state where it is retracted in the finder cover 49, the regulation shape portion 153 is engaged with the pivot regulation surface 156, so that a pivoting operation of the finder pivot portion 41 is regulated.

The regulation shape portion 153 includes the notch shape 158, and when the eyepiece portion 28 is in the state of being extended to the use position, the pivot regulation surface 156 of the pivot latch member 130 is placed at the notch shape 158 in the optical axis direction of the finder lens. Thus, the regulation shape portion 153 is not engaged with the pivot regulation surface 156.

The finder pivot portion 41 includes the finder guide tube 43 configured to hold the lens holder 42 and the fixing tube 45 which accommodates the tinder guide tube 43 such that the finder guide tube 43 is movable directly relative to the optical axis of the finder lens. At the latch position where a pivoting operation of the finder is latched, the latch contact surface 154 is in contact with the latch portion 145 of the fixing tube 45. The inviting surface 155 as a tapered surface is brought into contact with the latch portion 145 of the fixing tube 45 when the finder pivot portion 41 is returned from the rotated state to the latch position. When viewed from the eyepiece window 22 side, the inviting surface 155 as a tapered surface and the pivot regulation surface 156 are adjacent to each other, and the inviting surface 155 as a tapered surface and the latch contact surface 154 are adjacent to each other.

The finder cover 49 includes the two surfaces 49a of flat plates extending in a direction that is parallel to the optical axis direction G of the photographing optical system and is parallel to the movable direction between the retracted state and the extended state relative to the main body portion of the image capturing apparatus 1. When viewed from the surfaces 49a of the finder cover 49, the intersection point P formed in a direction of extension of the inviting surface 155 as a tapered surface and the pivot regulation surface 156, which are adjacent to each other, is within a projection of the thick portion of the regulation shape portion 153. The thick portion of the regulation shape portion 153 is the grip portion 157, which is gripped to extend the eyepiece portion 28.

While various exemplary embodiments have been described, the present disclosure is not limited to the disclosed exemplary embodiments, and various modifications and changes are possible within the spirit of the disclosure.

According to an aspect of the present disclosure, an image capturing apparatus includes a small, rotatable finder that does not extend from a main body portion of an image capturing apparatus when the finder is not in use. Thus, an image capturing apparatus including a finder that is prevented from improperly shifting to an unintended state is provided, so that a decrease in convenience is prevented and a camera is prevented from being damaged.

Embodiment(s) of the present disclosure can also be realized by a computer of a system or apparatus that reads out and executes computer executable instructions one or more programs recorded on a storage medium (which may also be referred to more fully as 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-165456, filed Sep. 11, 2019, which is hereby incorporated by reference herein in its entirety.

What is claimed is:

1. An image capturing apparatus comprising:
an electronic viewfinder unit configured to shift between a retracted state where the electronic viewfinder unit is retracted in a main body portion of the image capturing apparatus and an extended state where the electronic viewfinder unit is extended from the main body portion,
wherein the electronic viewfinder unit includes a pivoting unit, a holding cover configured to hold the pivoting unit such that the pivoting unit can be rotated centering on a pivot shaft, and a pivot latch member configured to latch in a pivoting operation of the pivoting unit, wherein the pivoting unit includes an electronic display unit, an eyepiece portion, an eyepiece window configured to cover the eyepiece portion, and a lens holder configured to hold a finder lens configured to guide light emitted from the electronic display unit to the eyepiece portion, and wherein, when the pivoting unit is being rotated, the pivot latch member regulates shifting of the electronic viewfinder unit to the retracted state in the main body portion.

2. The image capturing apparatus according to claim 1, wherein the pivot latch member is pivotally supported on a fixing member by a pivot latch shaft extending in an optical axis direction of the finder lens, wherein the holding cover is fixed to the fixing member, and wherein the pivot latch member is biased by a bias spring.

3. The image capturing apparatus according to claim 1, wherein the pivot latch member is configured to pivot to a regulation position at which the shifting of the electronic viewfinder unit to the retracted state is regulated, to a latch position at which the pivoting operation of the pivoting unit is latched, and to a release position at which the pivoting operation of the pivoting unit is unlatched, in this order in a pivoting direction of the pivoting unit, and wherein one end of the pivot latch member includes an abutment portion configured to be engaged with the main body portion at the regulation position.

4. The image capturing apparatus according to claim 3, wherein another end of the pivot latch member includes a contact surface configured to latch the pivoting unit and regulate the pivoting operation, and wherein, when viewed from the eyepiece window side, the contact surface and the abutment portion are on opposite sides of a pivot latch shaft.

5. The image capturing apparatus according to claim 4, wherein a pivoting regulation portion including the contact surface at the one end of the pivot latch member includes a tapered surface to return the pivoting unit from a pivoting state to a latched position.

\* \* \* \* \*